US008359885B2

(12) United States Patent
Tanii

(10) Patent No.: US 8,359,885 B2
(45) Date of Patent: Jan. 29, 2013

(54) SURFACE-TREATED GLASS AND PROCESS FOR PRODUCING THE SAME

(75) Inventor: Shirou Tanii, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 268 days.

(21) Appl. No.: 12/477,436

(22) Filed: Jun. 3, 2009

(65) Prior Publication Data

US 2009/0297772 A1    Dec. 3, 2009

Related U.S. Application Data

(63) Continuation of application No. PCT/JP2007/070277, filed on Oct. 17, 2007.

(30) Foreign Application Priority Data

Dec. 4, 2006    (JP) .................................. 2006-327317

(51) Int. Cl.
   *C03C 23/00* (2006.01)
(52) U.S. Cl. ................. 65/31; 65/30.1; 65/111
(58) Field of Classification Search .............. 65/30.1, 65/30.12, 111, 114–116, 118, 376–482, 31, 65/301, 119; 501/60; 703/1, 6–8; 700/97–98
   See application file for complete search history.

(56) References Cited

U.S. PATENT DOCUMENTS

| | | | | |
|---|---|---|---|---|
| 2,377,062 A * | 5/1945 | Adams | ............................ | 216/97 |
| 3,300,670 A * | 1/1967 | Veres | ............................ | 313/461 |
| 3,348,934 A * | 10/1967 | Hinson et al. | ................... | 65/30.1 |
| 3,563,718 A * | 2/1971 | Paplauskas et al. | ............... | 65/61 |
| 3,653,864 A * | 4/1972 | Rothermel et al. | .......... | 65/30.12 |
| 3,734,802 A * | 5/1973 | Cohen | ....................... | 156/345.23 |
| 3,782,915 A * | 1/1974 | Filbert et al. | ................. | 65/30.13 |
| 3,940,277 A * | 2/1976 | Pierson et al. | .................... | 501/4 |
| 4,098,596 A * | 7/1978 | Wu | ............................. | 65/30.12 |
| 4,099,834 A * | 7/1978 | Faulstich et al. | ............. | 385/141 |
| 4,099,978 A * | 7/1978 | Bartholomew et al. | .......... | 501/60 |
| 4,105,427 A * | 8/1978 | Elmer | ......................... | 65/30.12 |
| 4,201,561 A * | 5/1980 | Pierson et al. | .............. | 65/30.12 |
| 4,221,578 A * | 9/1980 | Shoup et al. | ...................... | 65/22 |
| 2006/0065017 A1 * | 3/2006 | Miyoshi et al. | ................... | 65/28 |

FOREIGN PATENT DOCUMENTS

| | | |
|---|---|---|
| JP | 60055530 A | 3/1985 |
| JP | 1-201048 | 8/1989 |
| JP | 6-78181 | 10/1994 |

(Continued)

OTHER PUBLICATIONS

Japanese Office Action issued May 8, 2012, in Japan patent Application No. 2006-327317 (with English translation).

(Continued)

*Primary Examiner* — Jason L. Lazorcik
(74) *Attorney, Agent, or Firm* — Oblon, Spivak, McClelland, Maier & Neustadt, L.L.P.

(57) ABSTRACT

An object of the present invention is to provide a surface-treated glass having a concave portion on the order of nanometers, in which the depth of the concave portion is sufficiently large for the size thereof and which is free from an abnormal bump portion and excellent in the transparency to visible light. The present invention relates to a surface-treated glass having a plurality of the concave portions provided in a glass surface, in which a plane of the glass surface, excluding a region in which the concave portions are formed, is a flat plane, and the concave portions have an average open pore diameter of 10 nm to less than 1 μm in a cross-sectional view thereof.

13 Claims, 9 Drawing Sheets

FOREIGN PATENT DOCUMENTS

| | | | |
|---|---|---|---|
| JP | 9295819 | A | 11/1997 |
| JP | 11171598 | A | 6/1999 |
| JP | 11171599 | A | 6/1999 |
| JP | 11278875 | A | 10/1999 |
| JP | 2000072491 | A | 3/2000 |
| JP | 2000-223724 | | 8/2000 |
| JP | 2000-348344 | | 12/2000 |
| JP | 2001-335342 | | 12/2001 |
| JP | 2002-352422 | | 12/2002 |

OTHER PUBLICATIONS

M. Yamane, "Basic Lecture on Ceramics 4: For those who prepare glass for the first time", $1^{st}$ edition, Kabushiki Kaisha Uchida Rokakuho, Jul. 10, 1989, pp. 48-51.

Office Action issued Jul. 18, 2012, in Japanese Patent Application No. 2006-327317, filed Dec. 4, 2006 (w/English translation).

* cited by examiner

SURFACE-TREATED GLASS AND PROCESS FOR PRODUCING THE SAME

TECHNICAL FIELD

The present invention relates to a surface-treated glass and a process for producing the same. More specifically, the present invention relates to a surface-treated glass where a concave portion on the order of nanometers is formed in the surface, and a process for producing the same.

BACKGROUND ART

Conventionally, it is known that an effect such as antireflection effect and antiglare effect are exhibited by formation of irregularities in the surface of a glass plate. In particular, there is known a technique of appropriately controlling the size, depth, pitch or the like of the concave portion to decrease the reflectance on the glass plate surface and thereby enhance the antiglare effect or to obtain an effect of increasing the wettability of immersion solution when forming a film on the glass surface by a dip-coating treatment. Also, it is known that when the size or the like of the concave portion is appropriately controlled, an effect of increasing the wettability to a glass fiber resin at the production of a glass fiber-reinforced plastic or controlling the light transmittance of architectural glass is exhibited. Furthermore, when a water-repellent film is formed after providing irregularities in the surface of a vehicle windshield, an effect of increasing durability of the water-repellent film against sliding friction with a rainwater wiper or the like thereby enhancing adherence of the water-repellent film to the windshield is also known.

The dimension such as size, depth and pitch of the concave portion on the glass surface is supposed to be adjustable in the range from several nm to several tens of μm by the production method. For example, Patent Documents 1 to 5 disclose a method of roughening a quartz glass substrate surface by a blasting method and then applying an etching treatment with an aqueous hydrofluoric acid solution to produce a quartz glass substrate having a semispherical dimple of 0.5 to 5 μm in diameter (Patent Document 1); a method of treating a glass surface with a glass surface-treating solution containing hydrogen fluoride to form an uneven surface having a surface roughness Ra of 0.1 to 2 μm and a surface roughness Rmax of 1 to 20 μm (Patent Document 2); a method of subjecting a glass substrate surface to a texturing treatment and then to a scrubbing treatment using a predetermined sponge to produce a glass substrate for image recording mediums (Patent Document 3); a method of precisely polishing a glass substrate surface with an abrasive containing a free abrasive grain and further applying a surface treatment with a hydrofluorosilicic acid to produce a glass substrate for magnetic recording mediums (Patent Document 4); and a method of reacting a sulfurous acid gas, an anhydrous sulfuric acid gas or a chlorine gas with a glass surface under heating to produce an $SiO_2$-rich layer on the glass surface and forming a hole of approximately from 1 to 5 μm by utilizing a thermal expansion difference between the $SiO_2$-rich layer and the glass base material at the subsequent reheating time (Patent Document 5).

Patent Document 1: JP-A-2000-223724
Patent Document 2: JP-A-2001-335342
Patent Document 3: JP-A-2002-352422
Patent Document 4: JP-A-2000-348344
Patent Document 5: JP-A-2000-72491

DISCLOSURE OF THE INVENTION

Problems that the Invention is to Solve

However, the methods described in Patent Documents 1 and 2 have a problem that use of an etching solution such as aqueous hydrofluoric acid solution inevitably requires a waste solution treatment or may incur an environmentally adverse effect by the etching solution and waste solution and also, the size of the formed concave portion may become approximately from several nm to several tens of μm. Additionally, since the methods described in Patent Documents 1, 3 and 4 involve a plurality of steps in the treatment process, there is a problem that a lot of time and effort, and cost are required.

Furthermore, in the methods described in Patent Documents 1 to 5, since the concave portion formed has a non-uniform shape and at the same time, an abnormal bump or the like is formed, there is a problem that, for example, reliability and accuracy required in use for a magnetic disk or the like are lowered. Also, in the method described in Patent Documents 1 to 5, since the concave portion formed is shallow and large as compared with the wavelength of visible light, there is a problem that the performance of controlling a light beam is insufficient and adherence of a functional film such as water-repellent film is also insufficient. In addition, the methods described in Patent Documents 1 to 5 have disadvantageous that a concave portion of 1 μm or less in size is difficult to form and the transparency of glass is impaired.

The present invention has been made under these circumstances and an object of the present invention is to provide a surface-treated glass having a concave portion on the order of nanometers, in which the depth of the concave portion is sufficiently large for the size thereof and which is free from an abnormal bump portion and excellent in the transparency to visible light. Another object of the present invention is to provide a process for producing this surface-treated glass, ensuring that the process is simple and highly safe and an environmental problem is lessened.

Means for Solving the Problems

The present inventors have made intensive studies to achieve the above-described objects, as a result, it has been found that when water vapor is put into contact with a glass surface under heating condition, a concave portion having an average open pore diameter on the order of nanometers is formed in the glass surface. That is, the present invention employs the following constructions as means for solving the problems.

The surface-treated glass of the present invention has a plurality of concave portions provided in a glass surface, wherein the plane of the grass surface, excluding the region in which the concave portions are formed, is a flat plane and the concave portions have an average open pore diameter of 10 nm to less than 1 μm in a cross-sectional view thereof.

In the surface-treated glass of the present invention, the area ratio of the open pore area of the concave portions to the unit area of the glass surface is preferably from 5 to 80%, and the average pitch between respective concave portions is preferably 1 μm or less in a cross-sectional view of the plurality of the concave portions.

In the surface-treated glass of the present invention, the concave portions are preferably formed by exposing a glass having a temperature in the range from strain point (° C.) to strain point +250 (° C.) to an atmosphere containing water in a concentration of 0.01 to 20 g/L.

In the surface-treated glass of the present invention, an alkali component is preferably contained in the range of 1 to 30 mass % in terms of an oxide. In the present invention, the amount of an alkali component in terms of an oxide indicates a total amount of $Na_2O$, $K_2O$ and $Li_2O$.

The process for producing a surface-treated glass of the present invention comprises a step of exposing a glass heated in the range from strain point (° C.) to strain point +250 (° C.) to an atmosphere containing water in a concentration of 0.01 to 20 g/L.

In the process for producing a surface-treated glass of the present invention, the atmosphere preferably further contains $SO_2$ in a concentration of 100 ppm or less.

In the process for producing a surface-treated glass of the present invention, the exposure time for exposing the glass to the atmosphere is preferably 1 minute or more.

In the process for producing a surface-treated glass of the present invention, the glass preferably contains an alkali component in the range of 1 to 30 mass % in terms of an oxide.

In the process for producing a surface-treated glass of the present invention, the step of exposing the glass to the atmosphere is preferably performed in a slow cooling step after a forming step on a glass plate production line. As a forming step, a float process is preferable.

According to the surface-treated glass above, since concave portions having an average open pore diameter of 10 nm to less than 1 μm are formed in the surface, the light transmittance in the visible region, particularly at a wavelength of approximately from 380 to 550 nm and the ultraviolet region particularly at a wavelength of approximately from 360 to 380 nm, can be controlled and also, the surface-treated glass can have a light transmittance in the visible region of the practically useful range and be enhanced in wettability, hydrophilicity and the like for a liquid such as water. As for the practically useful high wettability and hydrophilicity, the contact angle for 0.1 ml of a water droplet is preferably 40° or less.

In the case of coating a functional film such as water-repellent film on the surface, since an anchoring effect by the concave portions is exerted, adherence of the functional film can be enhanced.

Also, since the plane of the glass surface, excluding the region in which the concave portions are formed is a flat plane, in use, for example, as a substrate for magnetic disks, reduction in the reliability due to an abnormal bump portion can be prevented.

Furthermore, according to the surface-treated glass above, the open pore area ratio of concave portions to the glass surface is from 5 to 80%, the average pitch between respective concave portions in a cross-sectional view of the plurality of concave portions is 1 μm or less, and the concave portions are uniformly formed throughout the glass surface, so that a fear of causing a distribution variation of concave portions in the surface can be eliminated. Also, since concave portions are relatively in proximity to each other, the light transmittance particularly on the short wavelength side can be controlled.

In addition, according to the surface-treated glass above, since the concave portions are formed by exposing a glass plate heated at a predetermined temperature to a water-containing atmosphere, the production cost can be greatly reduced.

According to the process for producing the surface-treated glass above, since the concave portions can be formed by exposing a heated glass to a water-containing atmosphere, the surface-treated glass can be rapidly and efficiently produced.

Also, since the step of exposing the glass to a water-containing atmosphere is performed in a slow cooling step as a post-step of a forming step such as float process, the surface-treated glass can be efficiently and continuously produced.

Advantages of the Invention

According to the present invention, a surface-treated glass having a concave portion on the order of nanometers, in which the depth of the concave portion is sufficiently large for the size thereof and which is free from an abnormal bump portion and excellent in the transparency to visible light, can be provided. Also, according to the present invention, a process for producing this surface-treated glass, ensuring that the process is simple and highly safe and an environmental problem is lessened, can be provided.

DESCRIPTION OF REFERENCE NUMERALS AND SIGNS

| 1 and 5 | Glass surface |
| 2 | pore (concave portion) |
| 3 and 8 | flat plane |
| 6 | concave (concave portion) |
| 7 | groove (concave portion). |

BEST MODE FOR CARRYING OUT THE INVENTION

Figure 1:
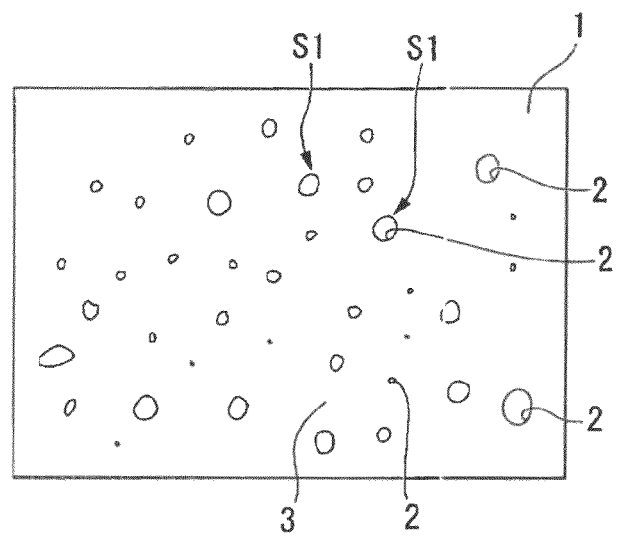
FIG. 1 is an enlarged schematic view showing one example of the surface of the surface-treated glass as an embodiment of the present invention.
Figure 2:
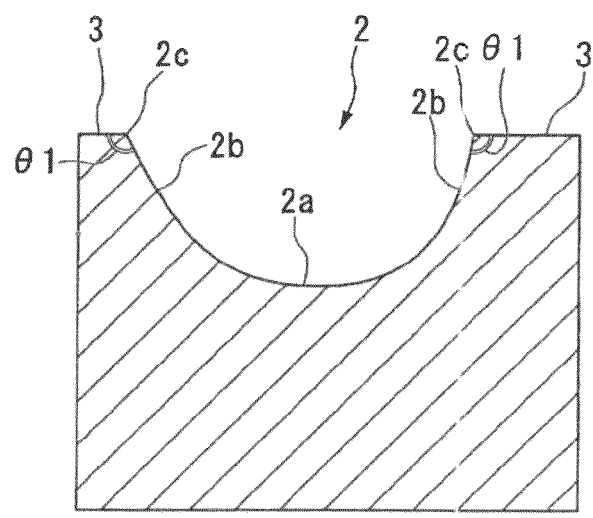
FIG. 2 is a cross-sectional schematic view showing, in a partially enlarged scale, a part of a concave portion provided in the surface-treated glass plate shown in FIG. 1.
Figure 3:
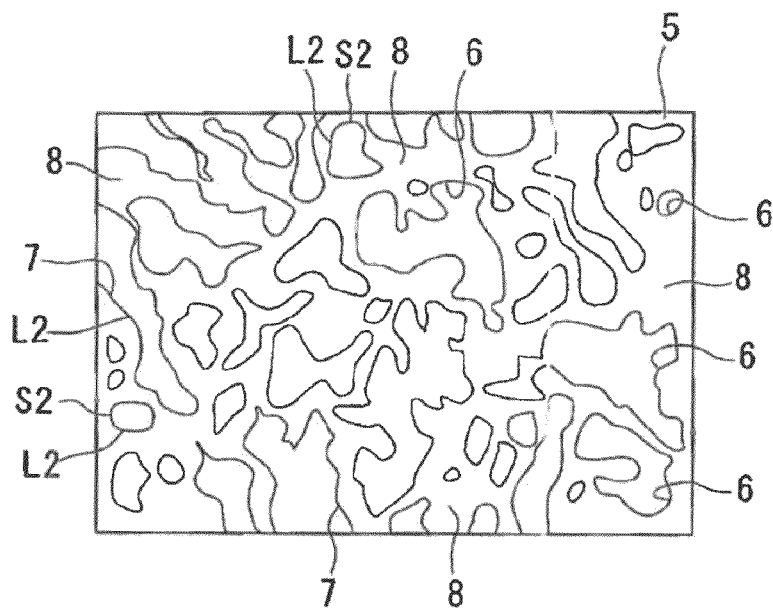
FIG. 3 is an enlarged schematic view showing another example of the surface of the surface-treated glass as an embodiment of the present invention.
Figure 4:
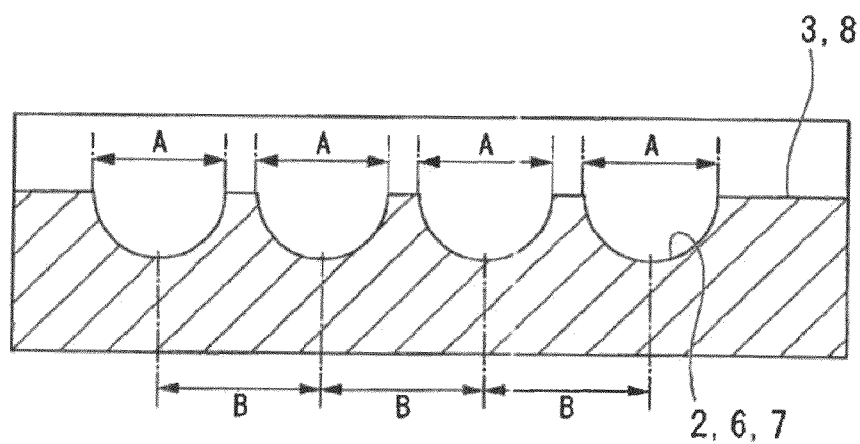
FIG. 4 is a cross-sectional schematic view of a part of the surface-treated glass as an embodiment of the present invention.

The embodiments of the present invention are described below by referring to the drawings. FIG. 1 is an enlarged schematic view showing one example of the surface of the surface-treated glass as an embodiment of the present invention; FIG. 2 is a cross-sectional schematic view showing, in a partially enlarged scale, a part of a concave portion provided in the surface-treated glass plate shown in FIG. 1; FIG. 3 is an enlarged schematic view showing another example of the surface of the surface-treated glass as an embodiment of the present invention; and FIG. 4 is a cross-sectional schematic view of a part of the surface-treated glass shown in FIG. 1 or 3.

As for the specific mode of the surface-treated glass in this embodiment, a plate glass is preferred. That is, the surface-treated glass of this embodiment is a surface-treated glass having a plurality of concave portions provided in a plate glass surface, wherein the plane of the glass surface, excluding the region in which the concave portions are formed, is a flat plane and the average open pore diameter of concave portions in a cross sectional view thereof is from 10 nm to less than 1 μm. The concave portions may be provided on one side of the plate glass or may be provided on both sides of the plate glass.

The concave portion in this embodiment may be an independent pore nearly circular in planar view, a concave amorphous in planar view, or a continuous groove amorphous in planar view. Also, in the surface-treated glass, at least one member of a pore, a concave and a groove may be formed, or two or more members of a pore, a concave and a groove may be formed at the same time.

In FIG. 1, an enlarged plan schematic view of a surface-treated glass having formed therein a plurality of independent pores as the concave portion is illustrated. Also, in FIG. 3, an enlarged plan schematic view of a surface-treated glass having formed therein a plurality of concaves and grooves as the concave portion is illustrated.

In the surface 1 of the surface-treated glass shown in FIG. 1, a plurality of pores 2 nearly circular in plan view are formed. In the surface 1, a plane excluding the region in which the pores 2 are formed is a flat plane 3. The pore 2 has, as shown in FIG. 2, a mortar-like cross-sectional shape with the bottom 2a being slightly flat, and the slope angle is gradually increased toward the flat plane 3 side of the glass surface from the bottom 2a. Also, a corner 2c defining the shape of the pore 2 in plan view is formed between the inclined side wall surface 2b of the pore 2 and the flat plane 3 of the glass surface, and the corner 2c composes the contour marking off the shape of the pore 2 in plan view. The angle θ1 at which the inclined side wall surface 2b of the pore 2 and the flat plane 3 of the glass surface are crossing in the corner 2c is, for example, from 90 to 150°.

In the surface 5 of the surface-treated glass shown in FIG. 3, a plurality of concaves 6 amorphous in plan view and a plurality of continuous grooves 7 amorphous in plan view are formed. In this surface, the plane excluding the region in which the concaves 6 and grooves 7 are formed is a flat plane 8. The concaves 6 and grooves 7 are in a mutually complicated and intricate state. The concave 6 and groove 7 have a mortar-like shape in cross-sectional view with the bottom being slightly flat, almost similarly to the pore shape in cross-sectional view shown in FIG. 2, and the slope angle is gradually increased toward the flat plane 8 side of the glass surface from the bottom. Also, a corner defining the shape of the concave 6 or groove 7 in plan view is formed between the inclined side wall surface 2b of the concave 6 or groove 7 and the flat plane 8 of the glass surface, and this corner composes the contour marking off the shape of the concave 6 or groove 7 in plan view. The angle at which the inclined side wall surface of the concave 6 or groove 7 and the flat plane 8 of the glass surface are crossing in the corner is the same as in the case of a pore.

Incidentally, in this embodiment, the flat plane excluding the region in which the concave portions are formed is a plane formed by allowing the glass plate surface before formation of concave portions to remain as it is after forming the concave portions. In the case where the original glass plate is produced, for example, by a floating method, the flatness of the flat plane becomes very high and in turn the surface-treated glass comes to have high transparency to visible light.

In FIG. 4, a cross-sectional schematic view of an arbitrary portion of the surface-treated glass shown in FIG. 1 or 3 is illustrated. The concave portion of the surface-treated glass shown in FIG. 1 is a pore, whereas the concave portion of the surface-treated glass shown in FIG. 3 is a concave or a groove, but in both cases, the cross-sectional shape of the surface-treated glass becomes the shape shown in FIG. 4.

As shown in FIG. 4, the average open pore diameter of concave portions indicates an average of open pore widths A when the cross section of a plurality of concave portions comprising a pore, a concave or a groove is viewed from an arbitrary direction. Incidentally, the pore is formed to have a curved and closed contour S1 as shown in FIG. 1, whereas the concave or groove is formed to have a short side part S2 and a long side part L2 as shown in FIG. 3, but the arbitrary cross-section contains a contour S1, a short side part S2 and a long side part L2. The average open pore diameter of concave portions of the surface-treated glass in this embodiment is preferably from 10 nm to less than 1 μm, more preferably from 10 to 100 nm. The open pore diameter of the concave portion needs not be uniform among concave portions but may differ in the range of 10 mm to less than 1 μm from one concave portion to another. The case where the average open pore diameter is less than 10 nm is not preferable because wettability can be hardly enhanced; and a sufficiently high anchoring effect is not obtained when a functional film or the like is laminated on the glass surface. On the other hand, the case where the average open pore diameter is 1 μm or more is not preferable because visible light is scattered to increase the haze ratio thereby making it difficult to control the light transmittance; the wettability can be also hardly raised; and a sufficiently high anchoring effect is not obtained when a functional film or the like is further laminated on the glass surface.

Describing the relationship between the average open pore diameter of the concave portion and the light transmittance, in the case where light enters to a surface-treated glass provided with concave portions, light at the wavelength of length corresponding to the average open pore diameter of concave portions can be scattered. For example, when concave portions having an average open pore diameter of less than 1 μm are formed, light in the ultraviolet region at a wavelength of approximately from 200 to 380 nm can be scattered on the glass surface to reduce the transmittance of light at a wavelength of approximately from 200 to 380 nm. In this way, adjusting the average open pore diameter of concave portions may control the transmission of light at a specific wavelength.

The depth of the concave portion is, in relation with the average open pore diameter, preferably in the range of average open pore diameter/depth=from 10/100 to 1000/50, more preferably from 10/100 to 100/100. For example, the depth of concave portions having an average open pore diameter of 100 nm may be about 50 nm. When the concave portion depth is too small for the average open pore diameter, not only the light transmittance can be hardly controlled but also when a functional film or the like is laminated, the anchoring effect by the concave portions is disadvantageously reduced.

The density of concave portions can be expressed by the average pitch between respective concave portions. The average pitch indicates, as shown in FIG. 4, an average of concave portion pitches B. The average pitch B is preferably 1 μm or less, more preferably from 10 to 100 nm. Also, the pitch B between respective concave portions needs not be uniform among concave portions but may differ in the range of 1 μm or less from one concave portion to another. The case where the average pitch exceeds 1 μm is not preferable because the density of concave portions decreases thereby making it difficult to control the light transmittance; the wettability can be also hardly raised; and a sufficiently high anchoring effect is not obtained when a functional film or the like is further laminated on the glass surface.

The density of concave portions can also be expressed by the number of concave portions cutting across a 2 μm-long line by drawing the 2 μm-long line at an arbitrary position in an arbitrary direction on the glass surface. In the surface-treated glass of this embodiment, when a 2 μm-long line is drawn, the number of concave portions cutting across this line is preferably 1 or more. The case where the number of concave portions is less than 1 is not preferable because the density of concave portions decreases thereby making it difficult to control the light transmittance; the wettability can be also hardly raised; and a sufficiently high anchoring effect is not obtained when a functional film or the like is further laminated on the glass surface.

The area ratio of the open pore area of concave portions to the unit area of the glass surface is preferably from 5 to 80%, more preferably from 50 to 80%. The case where the area ratio is less than 5% is not preferable because, in view of relationship between the average open pore diameter and the average pitch, the number density of concave portions per unit area of the glass surface decreases due to reduction in the exclusive area of concave portions thereby making it difficult to control the light transmittance; the wettability can be also hardly raised; and a sufficiently high anchoring effect is not obtained when a functional film or the like is further laminated on the glass surface.

On the other hand, when the area ratio exceeds 80%, the area of the flat plane decreases due to increase in the exclusive area of concave portions and the pores start combining with each other to allow for excessive roughening of the glass surface, as a result, the light transmittance becomes difficult to control, which is not preferred.

The glass for use in the surface-treated glass of this embodiment preferably contains an alkali component such as $Na_2O$, $K_2O$ and $Li_2O$ in the range of 1 to 30 mass % in terms of an oxide.

When an alkali component is not contained, as described later, even when the glass heated to a predetermined temperature is exposed to a water-vapor atmosphere, concave portions may not be formed and this is not preferred.

Specific examples of the glass composition include a soda lime glass having a composition of $SiO_2$: from 50 to 80 mass %, $Na_2O$: from 5 to 20 mass %, $K_2O$: from 0 to 15 mass %, $Li_2O$: from 0 to 5 mass %, CaO: from 5 to 15 mass %, MgO: from 0 to 10 mass %, BaO: from 0 to 10 mass %, and $Al_2O_3$: from 0 to 10 mass %;

a borosilicate glass having a composition of $SiO_2$: from 64 to 80 mass %, $Na_2O$: from 1 to 10 mass %, $K_2O$: from 1 to 10 mass %, $Li_2O$: from 0 to 2 mass %, MgO: from 0 to 1 mass %, $B_2O_3$: from 10 to 20 mass %, and $Al_2O_3$: from 1 to 8 mass %;

an aluminosilicate glass having a composition of $SiO_2$: from 50 to 70 mass %, $Na_2O$: from 0 to 2 mass %, $Li_2O$: from 0 to 1 mass %, CaO: from 5 to 25 mass %, MgO: from 0 to 8 mass %, $B_2O_3$: from 0 to 20 mass %, and $Al_2O_3$: from 10 to 20 mass %; and an alkali lead silicate glass having a composition of $SiO_2$: from 0 to 60 mass %, $Na_2O$: from 0 to 5 mass %, $K_2O$: from 0 to 10 mass %, and PbO: from 20 to 80 mass %.

Also, in the production method of the surface-treated glass of this embodiment, a glass containing an alkali component in the range of 1 to 30 mass % in terms of an oxide is preferably used. The amount of an alkali component in terms of an oxide indicates a total amount of $Na_2O$, $K_2O$ and $Li_2O$. When the alkali component content in the glass is 1% or more, a reaction of an alkali metal in the surface components of glass with water and depending on the case, with $SO_2$ takes place to sufficiently produce a product such as NaOH contributing to the formation of concave portions and this enables forming concave portions in a high density. Examples of the glass containing an alkali component include the above-described soda lime glass, borosilicate glass, aluminosilicate glass, aluminoborosilicate glass and alkali lead silicate glass.

Incidentally, in the above-described composition of each glass, various metal oxides, nonmetal oxides, metal fluorides and the like may be added, if desired.

The concave portions in the surface-treated glass of this embodiment are formed by exposing a glass having a temperature in the range from strain point (° C.) to strain point +250 (° C.) to an atmosphere containing water in a concentration of 0.01 to 20 g/L.

More specifically, it is presumed that when a glass heated to a temperature region highly likely to bring about a reaction is contacted with an atmosphere containing a high concentration of water, a lot of OH groups are introduced into the glass surface, an alkali metal in the surface components of glass reacts with water to cause uniform nucleation of a product such as NaOH and $NaSO_4$ on the order of nanometers, and the glass surface is corroded by this product, as a result, after removing the product by washing, concave portions in the surface-treated glass of this embodiment are formed. Therefore, the glass surface having formed therein concave portions does not have a random non-uniform structure as in the case of polishing the glass surface, but takes a form of only fine concave portions being uniformly distributed in the plane. Accordingly, to the glass surface has a uniform structure free from an abnormal bump and the like.

The process for producing the surface-treated glass of this embodiment is described below.

The surface-treated glass of this embodiment is produced through a forming step such as float process of forming a high-temperature glass melt, for example, into a plate-like glass and an exposure step of exposing the formed glass to a water-vapor atmosphere. Also, the surface-treated glass of this embodiment may be produced by a so-called batchwise system where a glass plate passed through a forming step, a slow cooling step and a cutting step and further once cooled to room temperature is reheated at a predetermined temperature and then exposed to a water-vapor atmosphere, or may be produced by a so-called continuous system of continuously performing the exposure step immediately after the forming step. In the case of production by a continuous system, the step of slow cooling the glass and the exposure step may be integrally performed.

Figure 5:
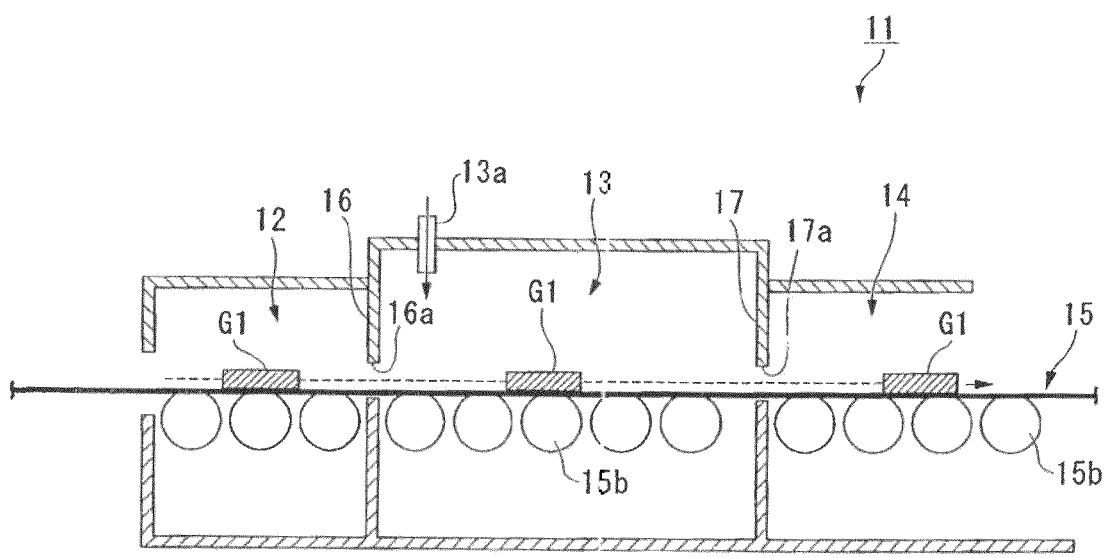
FIG. 5 is a schematic view showing one example of the production equipment for the surface-treated glass as an embodiment of the present invention.
Figure 6:
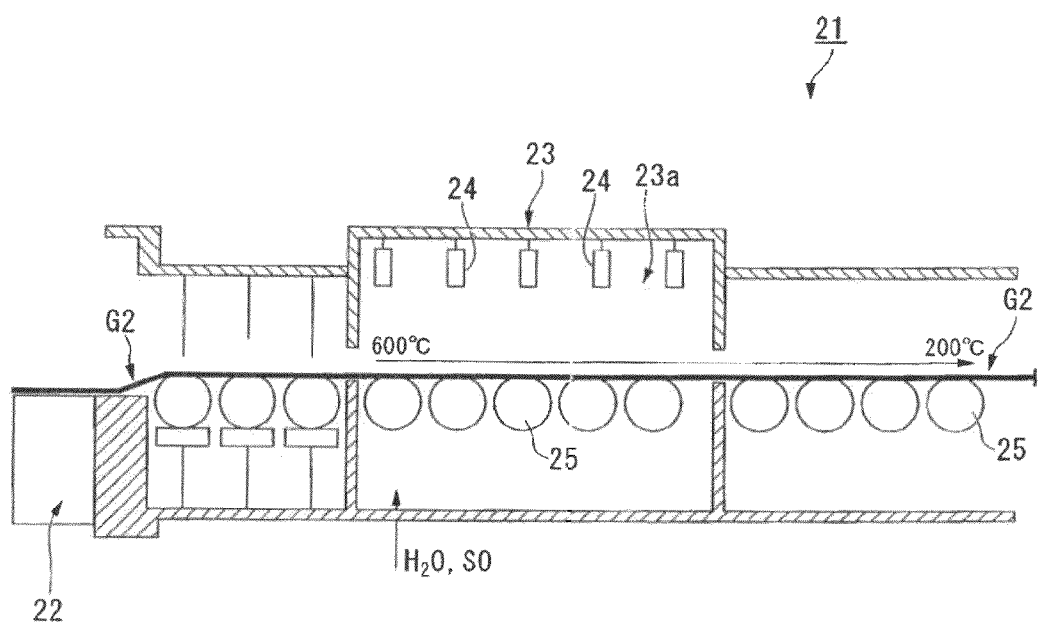
FIG. 6 is a schematic view showing another example of the production equipment for the surface-treated glass as an embodiment of the present invention.

In FIG. 5, the batchwise exposure step equipment (production equipment) for the surface-treated glass is illustrated by a schematic view, and in FIG. 6, the continuous exposure step equipment (production equipment) for the surface-treated glass is illustrated by a schematic view. The batchwise production equipment 11 shown in FIG. 5 is roughly composed of a preheating chamber 12, an exposure processing chamber 13 placed downstream of the preheating chamber 12, a slow cooling chamber 14 placed downstream of the exposure treating chamber 13, and a transporting conveyor 15 for transporting a glass G1 to the preheating chamber 12, the exposure processing chamber 13 and the slow cooling chamber 14 in this order.

The preheating chamber 12 is equipped with a heater (not shown) for heating the transported glass G1 in the range from strain point (° C.) to strain point +250 (° C.). Also, in the exposure processing chamber 13, a heat-retaining heater (not shown) for keeping warm the glass G1 heated in the preheating chamber 12 and a supply nozzle 13a for supplying a water-vapor atmosphere into the exposure processing chamber 13 are provided. Furthermore, the slow cooling chamber 14 has a length long enough to slowly cool the glass G1 for not generating distortion inside of the glass G1 due to a temperature difference. The transporting conveyor 15 is composed of a plurality of transporting rollers 15b.

In the partition wall 16 separating the preheating chamber 12 and the exposure processing chamber 13, an opening 16a for transferring the glass G1 from the preheating chamber 12 to the exposure processing chamber 13 is provided, and in the partition wall 17 separating the exposure processing chamber 13 and the slow cooling chamber 14, an opening 17a for transferring the glass G1 from the exposure processing chamber 13 to the slow cooling chamber 14 is provided.

The glass G1 transported to the batchwise production equipment 11 is delivered to the preheating chamber 12 by the transporting conveyor 15 and heated in the range from strain point (° C.) to strain point +250 (° C.). Subsequently, the glass G1 is transported to the exposure processing chamber 13 through the opening 16a and exposed in a heated state to a water-containing atmosphere for a predetermined time and after exposure, is transported to the slow cooling chamber 14 through the opening 17a, and the glass G1 is gradually cooled in the course of passing the slow cooling chamber 14.

In the case of forming concave portions only on one side of the glass G1 in the batchwise production equipment 11, this may be attained, for example, by applying a measure not to allow the water vapor to run round to the transporting surface of the glass G1 and exposing only the surface opposite the transporting surface of the glass G1 to water vapor.

The transporting conveyor may be a belt conveyor and in the case of forming concave portions on both sides of the glass G1, this may be attained, for example, by applying a measure to allow the water vapor to run round to the gap between the glass G1 and the transporting belt 15a, such as use of a meshed transporting belt 15a, and exposing both sides of the glass G1 to water vapor.

The continuous production equipment shown in FIG. 6 is incorporated into a slow cooling apparatus of plate glass production equipment employing a floating system. That is, the production equipment 21 shown in FIG. 6 is a slow cooling apparatus 23 placed downstream of a floating bath 22, and a supply nozzle 24 for introducing a water-containing atmosphere gas is equipped in a part of a lehr 23a inside of the slow cooling apparatus 23. Also, the production equipment 21 shown in FIG. 6 is equipped with transporting rollers 25 for transporting a glass G2 from the floating bath 22 to the slow cooling apparatus 23.

The glass G2 formed into a plate form in the floating bath 22 is, still in a high-temperature state, conveyed by the transporting rollers 25 to the lehr 23a of the slow cooling apparatus. In the lehr 23a, the temperature of the glass is controlled to the range from strain point (° C.) to strain point +250 (° C.) and at the same time, the glass G2 is exposed to a water-vapor atmosphere. Thereafter, the glass G2 is slowly transported in the lehr 23a and during this time, the glass G2 is cooled.

In the case of forming concave portions only on one side of the glass G2 in the continuous production equipment 21, this may be attained, for example, by applying a measure not to allow the water vapor to run round to the glass G2 surface on the transporting roller 25 side and exposing only the glass G2 surface opposite the surface on the transporting roller 25 side to water vapor.

On the other hand, in the case of forming concave portions on both sides of the glass G2, this may be attained, for example, by applying a measure to supply water vapor also to the transporting roller 25 side of the glass G2, such as placement of a supply nozzle also on the transporting roller 25 side of the glass G2, and exposing both sides of the glass G2 to water vapor.

The temperature of the glass in the exposure step is preferably from strain point (° C.) of glass to strain point +250 (° C.). Incidentally, in this embodiment, the strain point is a temperature at the glass viscosity of $4 \times 10^{14}$ poises and although it varies depending on the glass composition, for example, in the case of soda lime glass that is generally used as a plate glass, the strain point is 510° C. Accordingly, the heating temperature when using soda lime glass as the glass is preferably from 510 to 760° C., more preferably from 550 to 700° C.

By setting the temperature of the glass to the range from strain point (° C.) to strain point +250 (° C.), an alkali metal in the surface components of the glass reacts with water and this contributes to the formation of concave portions.

A product such as NaOH and $Na_2SO_4$ is produced and it is presumed that this product is produced (condensed as dew) like an island on the glass surface and the glass surface is appropriately corroded by the product produced (condensed as dew), whereby a concave portion having a sufficiently large depth for the average open pore diameter, for example, a concave portion having a ratio of average open pore diameter/depth of about 2/1, is formed. The shape of the concave portion can be controlled by the shape of the product produced (condensed as dew) like an island. Also, the production (dew condensation) state of the product can be controlled, for example, by the temperature of the glass or the water concentration in the atmosphere.

When the temperature of the glass is less than the strain point (° C.), the reaction of an alkali metal in the surface components of the glass with water proceeds insufficiently and a product contributing to formation of concave portions is disadvantageously not formed, whereas when the temperature of the glass exceeds the strain point +250 (° C.), the glass per se is softened, failing in formation of concave portions, and this is not preferred.

The atmosphere in the exposure step is preferably a water-containing atmosphere, that is, a water-vapor atmosphere, and may contain $SO_2$, $CO_2$ or $NO_2$ in addition to water. Also, the atmosphere is sufficient if it is, for example, an air atmosphere, a nitrogen atmosphere or an inert gas atmosphere such as argon. The water concentration in the atmosphere is preferably from 0.01 to 20 g/L, more preferably from 0.1 to 10 g/L. The water concentration as used herein is a concentration of steam at the glass heating temperature. It is presumed that by setting the water concentration to the above-described range, a concave portion having a sufficiently large depth for the average open pore diameter, for example, a concave portion having a ratio of average open pore diameter/depth of about 2/1, is formed. Also, there is a tendency to readily form a concave portion composed of a hole nearly circular in plan view as the water concentration is lower and readily form a concave portion composed of an amorphous concave or groove as the water concentration is higher.

When the water concentration is less than 0.01 g/L, the reaction of an alkali metal in the surface components of the glass with water proceeds insufficiently and a product contributing to formation of concave portions is disadvantageously not formed, whereas when the water concentration exceeds 10 g/L, the product adheres throughout the glass surface and the entire area of the glass is disadvantageously corroded to bring about etching of even the flat plane.

In the water-vapor atmosphere, $SO_2$ and/or $NO_2$ may be added in a concentration of 100 ppm or less. The addition of such an acidic component gas is presumed to accelerate the reaction of forming a product by an alkali metal in the glass together with water. When the concentration of $SO_2$ and/or $NO_2$ exceeds 100 ppm, the product cannot be stably present and this is not preferred.

The exposure time for exposing the glass to a water-vapor atmosphere is preferably 1 minute or more, more preferably from 3 to 30 minutes. When the exposure time is less than 1 minute, formation of concave portions proceeds insufficiently and this is not preferred. Incidentally, there is a tendency to readily form a concave portion composed of a hole nearly circular in plan view as the exposure time is shorter and readily form a concave portion composed of an amorphous concave or groove as the exposure time is longer.

The glass after the exposure processing is preferably washed by providing a washing step subsequently to the exposure step and the slow cooling step. The washing may be normal washing with warm water. By the washing, the product adhering to the glass surface can be washed out.

The surface-treated glass of this embodiment is produced by passing through drying, cutting and plate-collecting steps after the washing step.

As described above, according to the surface-treated glass of this embodiment, concave portions having an average open pore diameter of 10 nm to less than 1 μm are formed in the glass surface, so that the light transmittance can be controlled.

Also, wettability to a liquid such as water is enhanced by the formation of concave portions in the glass surface, so that hydrophilicity and the like can be enhanced. By virtue of high wettability, a functional film can be uniformly coated when coating a functional film or the like by a dipping method or a spin coating method.

In the case of coating a functional film such as water-repellent film on the surface, an anchoring effect by the concave portions is exerted, so that adherence of the functional film can be enhanced. Also, of the surface, the plane excluding the region in which the concave portions are formed is a flat plane, so that in use, for example, as a substrate for magnetic disks, reduction in the reliability due to an abnormal bump portion can be prevented.

Furthermore, according to the surface-treated glass above, the open pore area ratio of concave portions to the glass surface is from 5 to 80%, the average pitch between respective concave portions at the cross-sectional view of the plurality of concave portions is 1 μm or less, and the concave portions are uniformly formed throughout the glass surface, so that a fear of causing a distribution variation of concave portions in the surface can be eliminated. Also, concave portions are relatively in proximity to each other, so that the light transmittance particularly on the short wavelength side can be controlled.

In addition, according to the surface-treated glass above, the concave portions are formed by exposing a glass plate heated at a predetermined temperature to a water-containing atmosphere, so that the production cost can be greatly reduced.

According to the surface-treated glass above, since the glass plate surface before forming concave portions remains as a flat plane as it is, the flatness in the periphery of a concave portion is high as compared with the case of forming concave portions by a wet etching method using an etching solution such as hydrofluoric acid and scattering of visible light in the region except for concave portions is reduced, so that transparency to visible light can be maintained.

For example, according to the surface-treated glass above, assuming that the light transmittance of an untreated glass is 100%, the transmittance of light at a wavelength of 550 nm can be from 99 to 100%.

According to the process for producing the surface-treated glass of this embodiment, the concave portions can be formed by exposing a heated glass to a water-containing atmosphere, so that the surface-treated glass can be rapidly and efficiently produced.

Also, in the case where the step of exposing the glass to a water-containing atmosphere is performed in a slow cooling step as a post-step of a forming step such as float process, the surface-treated glass can be efficiently and continuously produced.

The applications of the surface-treated glass of this embodiment include, for example, an optical element such as antireflection plate, a water-repellent glass used as automotive glass, a hydrophilic glass, and a substrate for magnetic disks. For the antireflection film, the surface-treated glass having formed therein concave portions can be used as it is. The water-repellent glass can be produced by forming a water-repellent film on the concave portion-formed side of the surface-treated glass. As for the hydrophilic glass, the surface-treated glass having formed therein concave portions may be directly used or the hydrophilic glass may be produced by further applying a hydrophilic treatment to the surface-treated glass. Incidentally, in the case of applying a film to the surface of the surface-treated glass of this embodiment, the film thickness is preferably 10% or less of the pore depth.

In the case where the surface-treated glass of this embodiment is used as a water-repellent glass for automobile front glass or as a hydrophilic glass, the water-repellent film or hydrophilic coating is formed to cover the concave portions and therefore, the adherence of the water-repellent film or hydrophilic coating becomes very high. In particular, when the glass surface is rubbed with a strong force by a wiper blade or the like, even if the water-repellent film or the like on the flat plane in the periphery of a concave portion falls off, the water-repellent film or the like in concave portions distributed at a high density is held at it is and therefore, the water-repellent effect or hydrophilic effect can be maintained over a long period of time.

Furthermore, as regards the control of wettability of the surface, high hydrophilicity can be imparted by controlling the binding degree of concave portions, in addition to the size and density of concave portions.

In addition, in the case where the surface-treated glass is used as a substrate for magnetic disks, the concave portion exerts a texture function, so that adsorption or the like of a magnetic head can be prevented. Also, when forming various magnetic films on the substrate for magnetic disks, fine and uniform nucleation is accelerated by the concave portions and a high film performance can be expected.

EXAMPLES

The present invention is described in greater detail below by referring to Examples.

Figure 7:
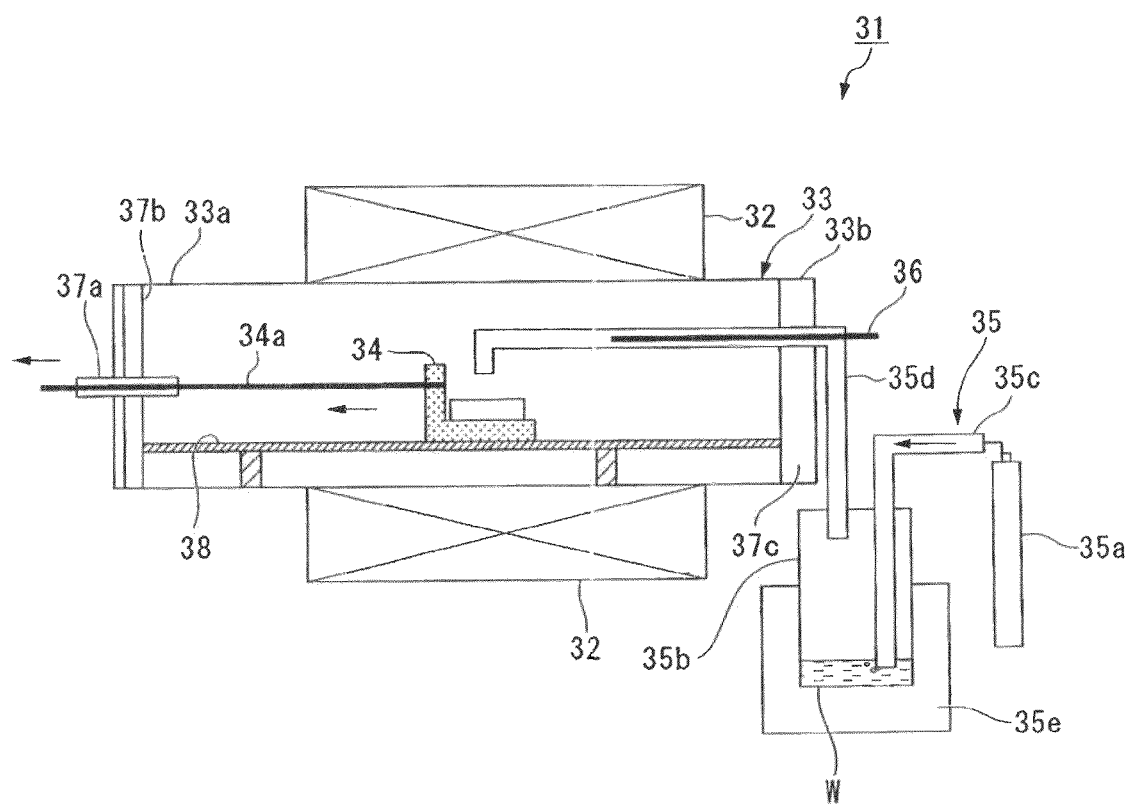
FIG. 7 is a schematic view showing the apparatus for producing a surface-treated glass, which is used in Examples.

A surface-treated glass was produced using the production apparatus shown in FIG. 7. The production apparatus 31 shown in FIG. 7 is roughly composed of an annular heating furnace 33 equipped with a heater 32, a sample carriage 34 made of a heat-resistant material and provided inside of the heating furnace 33, a water vapor introducing apparatus 35, and an acidic gas introducing tube 36.

The sample carriage 34 is fitted with a platinum wire 34a, and the platinum wire 34a is pulled out to one end 33a side of the heating furnace 33. The one end 33a of the heating furnace 33 is hermetically closed by a partition member 37b having a connecting pipe 37a, and the platinum wire 34a is pulled outside of the heating furnace through the connecting pipe 37a. The other and 33b of the heating furnace 33 is hermetically closed by another partition member 37b.

Also, a rail 38 for the sample carriage 34 is provided inside of the heating furnace 33 so that when the sample carriage 34 is pulled by the platinum wire 34a, the sample carriage 34 can run on the rail 38.

The water vapor introducing apparatus 35 is composed of an air cylinder 35a, a bubbling container 35b filled with water w, a pipe 35c for supplying air to the bubbling container 35b from the air cylinder 35a, a supply tube 35d for supplying water vapor to the heating furnace 33 from the bubbling container 35b through the partition member 37c, and a heater 35e for heating the water w in the bubbling container 35b. The pipe 35c and the supply tube 35d each is covered with a heat insulating material. Also, the supply tube 35d is integrated with the acidic gas introducing tube 36. The atmosphere in the heating furnace can be made to be a water-vapor atmosphere by this water vapor introducing apparatus 35. The water concentration in the water-vapor atmosphere can be controlled by adjusting the amount of air supplied from the air cylinder 35a and adjusting the temperature of water w by the heater 35e.

Examples and Comparative Examples are described below.

Examples 1 to 6

A 4 mm-thick soda lime glass plate ($SiO_2$: 70%, $Na_2O$ and $K_2O$: 14% in total, CaO, MgO, etc.: 16% in total, strain point: 515° C.) produced by a floating method was prepared, and this glass was placed on the sample carriage 34 of the production apparatus shown in FIG. 7. The sample carriage 34 was disposed on the other end 33b side of the heating furnace 33. Subsequently, the central portion of the heating furnace was previously heated by actuating the heater 32.

The sample carriage 34 was slowly moved by the platinum wire 34a to one end 33a side of the heating furnace 33, thereby gradually raising the glass temperature, and on reaching nearly the center of the heating furnace 33, the movement of sample carriage was stopped. Thereafter, water vapor and an $SO_2$ gas were introduced into the inside of the heating furnace 33 from the water vapor introducing apparatus 35 and the acidic gas introducing tube, thereby producing a water-vapor atmosphere in the heating furnace 33, and the glass under heating was exposed to the water-vapor atmosphere for a predetermined processing time.

After the passing of processing time, the supply of water vapor and $SO_2$ was stopped and the sample carriage 34 was again moved to one end 33a side of the heating furnace 33, whereby the glass temperature was gradually lowered.

Subsequently, the glass was washed with water to wash out the attached substances on the surface.

In this way, surface-treated glasses of Examples 1 to 6 were produced. The glass temperature, processing time (exposure time), and water ($H_2O$) and $SO_2$ concentrations in the atmosphere in each of Examples 1 to 5 are shown in Table 1.

Comparative Examples 1 and 2

Surface-treated glasses of Comparative Examples 1 and 2 were produced in the same manner as in Examples 1 to 6 except for changing the processing temperature, processing time (exposure time), and $H_2O$ and $SO_2$ concentrations.

Comparative Example 3

An aqueous solution-type etching solution containing hydrofluoric acid in a concentration of 20% was prepared and using this etching solution, the surface of the same soda lime glass plate as used in Examples 1 to 6 was treated by a chemical polishing method. In this way, the surface-treated glass of Comparative Example 3 was produced.

Figure 9:
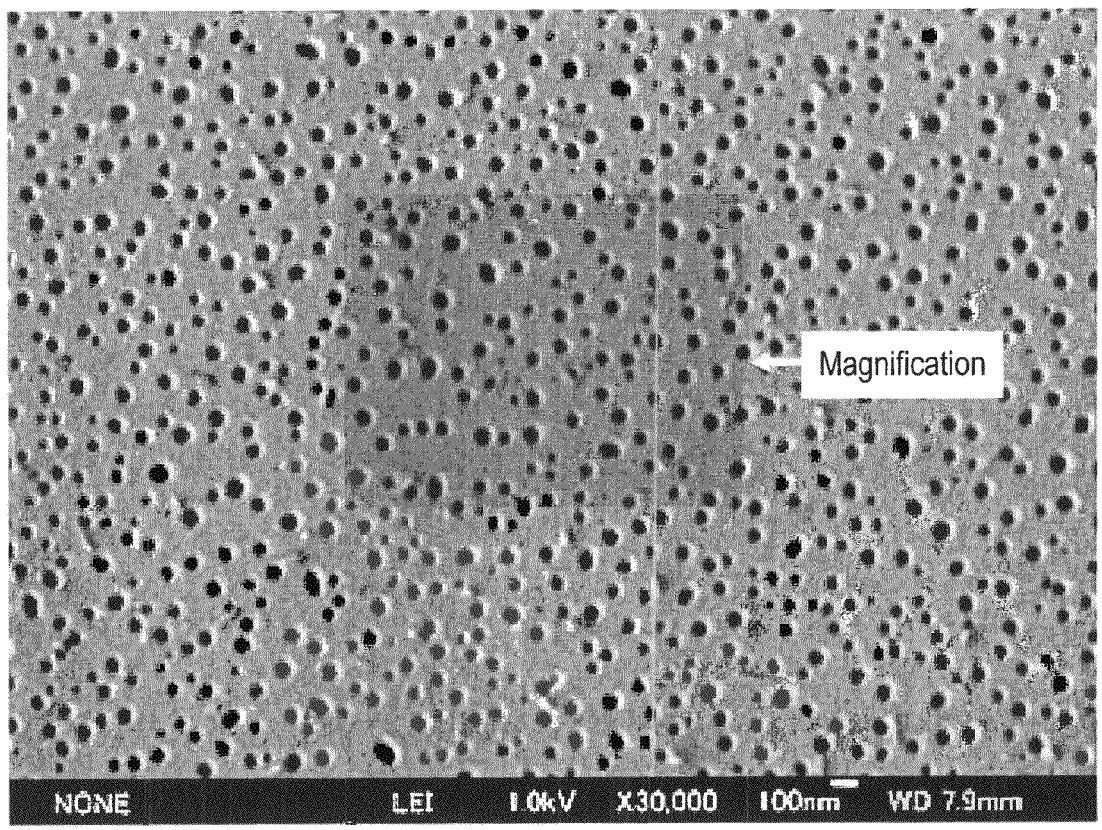
FIG. 9 is an SEM image of the surface-treated glass of Example 1.
Figure 10:
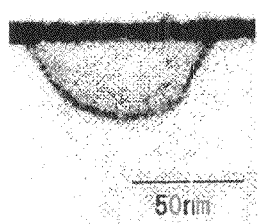
FIG. 10 is an SEM cross-sectional image of the surface-treated glass of Example 1.
Figure 11:
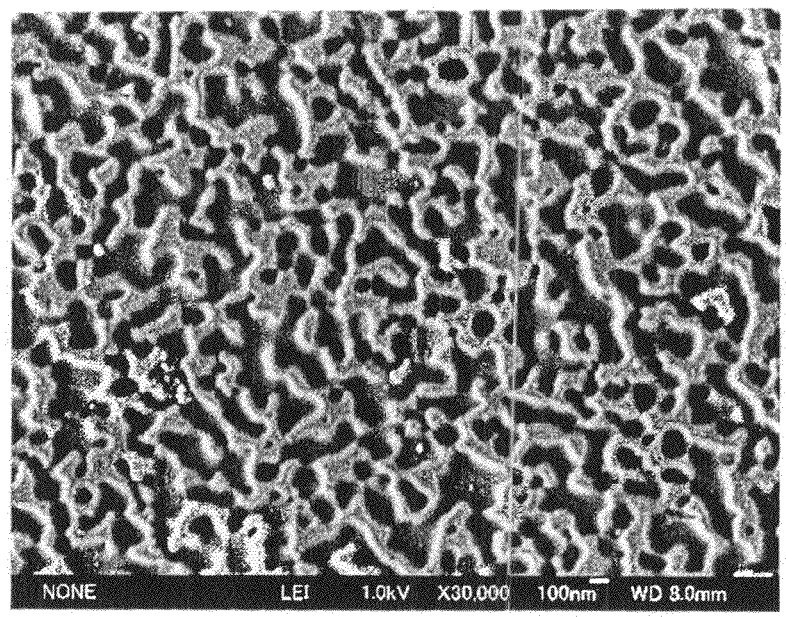
FIG. 11 is an SEM image of the surface-treated glass of Example 5.

The shape in plan view of the concave portion formed in each of the surface-treated glasses of Examples 1 to 6 and Comparative Examples 1 to 3 was observed by an electron microscope. FIG. 9 shows the electron micrograph of Example 1, FIG. 10 shows the cross-sectional photograph of the concave portion of Example 1, and FIG. 11 shows the electron micrograph of Example 5. Also, the shape of the concave portion in each surface-treated glass is shown in Table 2 by categories of pore, concave and groove. The pore indicates a pore nearly circular in plan view, the concave indicates a concave amorphous in plan view, and the groove indicates a continuous groove amorphous in plan view.

Also, each surface-treated glass was measured for average open pore diameter, average pitch, area ratio of the open pore area of concave portions to the unit area of glass surface (area ratio), and density of concave portions. The average open pore diameter, average pitch and area ratio were measured by image-processing the electron micrograph. As for the density of concave portions, a 2 μm-long line was drawn at an arbitrary position in an arbitrary direction on the glass surface, and the number of concave portions cutting across this 2 μm-long line is counted and defined as the density of concave portions. The results are shown in Table 2.

Figure 8:
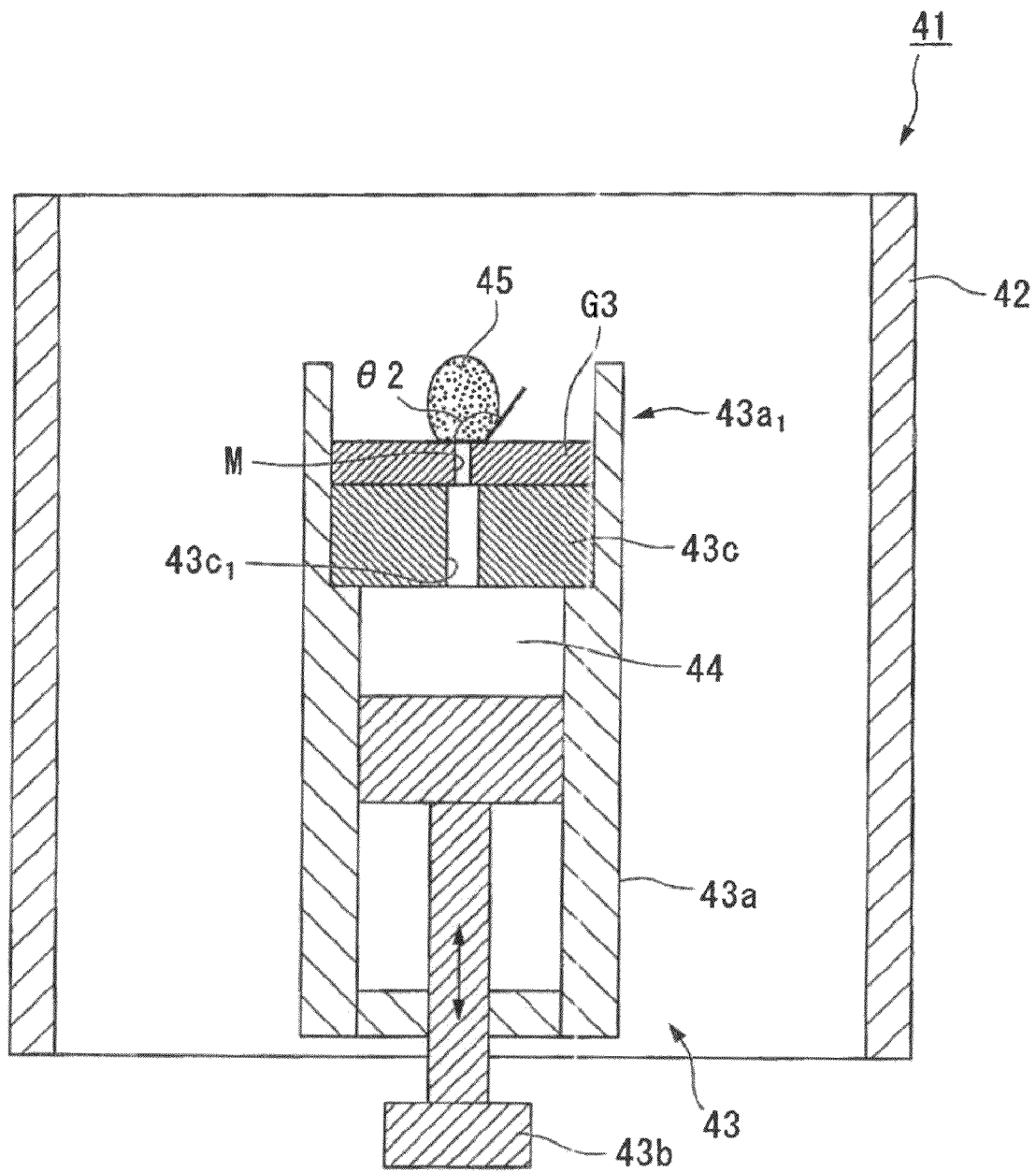
FIG. 8 is a schematic view showing the apparatus for evaluating wettability of a surface-treated glass, which is used in Examples.

Furthermore, the contact angle for water was measured by the evaluation apparatus shown in FIG. 8. The apparatus 41 for evaluating wettability shown in FIG. 8 is composed of a nearly cylindrical windshield 42, and a tester 43 disposed inside of the windshield 42. The tester 43 is composed of a cylinder 43a, a piston 43b, and a placing plate 43c engaged on one end 43a1 side of the cylinder 43a for placing the surface-treated glass G3 thereon. Water 44 is filled in the cylinder 43a and when the piston 43b is pushed, the water 44 is pushed out from a through hole 43c1 provided in the placing plate 43c.

The surface-treated glass G3 was placed on the placing plate 43c of the evaluation apparatus 41 shown in FIG. 8 with the concave portion-formed side up. The surface-treated glass G3 was placed, by previously forming a 0.5-mm through hole M therein, to allow the through hole M to communicate with the through hole 43c1 provided in the placing plate 43c. And when 0.0 ml of water droplet 45 was pushed out to the top of the surface-treated glass G2 via the through hole 43c1 of the placing plate 43 and the through hole M of the surface-treated glass plate G3, the contact angle θ2 between the water droplet 45 and the surface-treated glass was measured. The results are shown in Table 2.

Figure 12:
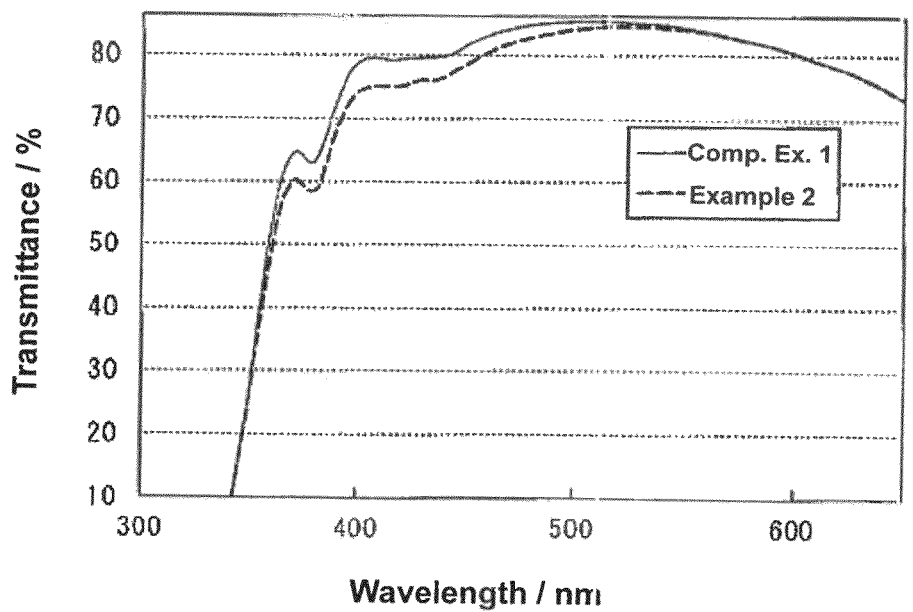
FIG. 12 is a graph showing the light wavelength dependency of light transmittance of the surface-treated glass of Example 2.

In addition, the light transmittance was measured using a spectrophotometer. The results are shown in Table 2. Also, FIG. 12 shows the wavelength dependency of light transmittance of Example 2.

TABLE 1

|  | Processing Temperature (° C.) | Processing Time (min) | $H_2O$ Concentration (g/L) | $SO_2$ Concentration (g/L) |
|---|---|---|---|---|
| Example 1 | 650 | 3 | 1 | 0.0001 |
| Example 2 | 650 | 10 | 1 | 0.0001 |
| Example 3 | 600 | 3 | 1 | 0.0001 |
| Example 4 | 700 | 10 | 1 | 0.0001 |
| Example 5 | 700 | 3 | 1 | 0.0001 |
| Example 6 | 650 | 3 | 1 | 0 |
| Comparative Example 1 | 650 | 3 | 0 | 0 |
| Comparative Example 2 | 450 | 3 | 1 | 0.05 |
| Comparative Example 3 | — | — | — | — |

TABLE 2

| | Concave portion | | | | | Light Transmittance | | |
|---|---|---|---|---|---|---|---|---|
| | Average open pore diameter (nm) | Average Pitch (nm) | Area Ratio (%) | Density (number/ 2 μm) | Shape | Ultraviolet Region (350 nm) | Visible Region (550 nm) | Contact Angle (°) |
| Example 1 | 75 | 200 | 24 | 10 | pore | 22.9 | 83.7 | 34 |
| Example 2 | 800 | 900 | 75 | 2 | pore | 25.9 | 82.4 | 38 |
| Example 3 | 30 | 100 | 26 | 20 | pore | 21.1 | 81.2 | 31 |
| Example 4 | 200 | 250 | 55 | 8 | pore | 18.3 | 84.0 | 38 |
| Example 5 | 100 | 200 | 16 | 10 | mixture of pore, concave and groove | 24.1 | 83.0 | 24 |
| Example 6 | 50 | 300 | 15 | 6 | pore | 26.5 | 82.8 | 31 |
| Comparative Example 1 | none | — | — | — | — | 29.4 | 84.1 | 58 |
| Comparative Example 2 | 150 | 1100 | 3 | 2 | pore | 29.1 | 85.1 | 57 |
| Comparative Example 3 | 2000 | 2000 | 52 | 1 | pore | 27.5 | 75.5 | 43 |

As seen in Table 2 and FIGS. 9 to 11, in the surface-treated glasses of Examples 1 to 6 and Comparative Examples 2 and 3, a concave portion composed of pore or a concave portion composed of a mixture of pore, concave and groove is formed and an abnormal bump portion is not present. In Example 1 where the black portion shown in FIG. 9 is a concave portion (pore), it is seen that the pores are uniformly distributed at a high density on the entire surface. Example 2 shown in FIG. 11 is the same as Example 1. On the other hand, in the surface-treated glass of Comparative Example 1, a concave portion is not formed. This is presumed to occur because the water concentration in the production conditions of Comparative Example 1 was 0 g/L and therefore, a concave portion was not formed at all.

Also, as seen in Table 2, the surface-treated glasses of Examples 1 to 6 exhibit a good value for all of average open pore diameter, average pitch, area ratio and density. On the other hand, in Comparative Example 2 where the processing temperature is too lower than the strain point, the formation of concave portions does not proceed and not only the average pitch exceeds 1,000 nm (1 μm) but also the area ratio is less than 5%. In Comparative Example 3 where the corrosion by the etching solution is excessively intense, the average open pore diameter, average pitch and area ratio all are out of respective proper ranges.

Furthermore, as seen in FIG. 12, in Example 2, the light transmittance tends to decrease in the wavelength range of 550 nm or less as compared with Comparative Example 1, and the range of decrease becomes large particularly at 400 nm or less. This is considered to occur because only light at a specific wavelength is scattered according to the average open pore diameter, density and depth of concave portions formed at a nanometer level and transmittance in the wavelength region where light is scattered is decreased. Also, as seen in Table 2, the transmittance in Examples 1 to 5 is lower than that in Comparative Examples 1 and 2. In Comparative Example 3 where the average open pore diameter of concave portions is too large, light is greatly scattered in the wavelength range of 550 nm or less to cause large reduction in the light transmittance, but in the ultraviolet region at a wavelength of 350 nm, the light transmittance is not significantly affected.

Also, as seen in Table 2, the contact angle tends to become small in Examples 1 to 5 as compared with Comparative Examples 1 to 3 and particularly, in the case of a structure where pore, concave and groove are mixed as in Example 5, not only the contact angle becomes small but also when the glass is tilted, excellent water drainage is exhibited.

Figure 13:
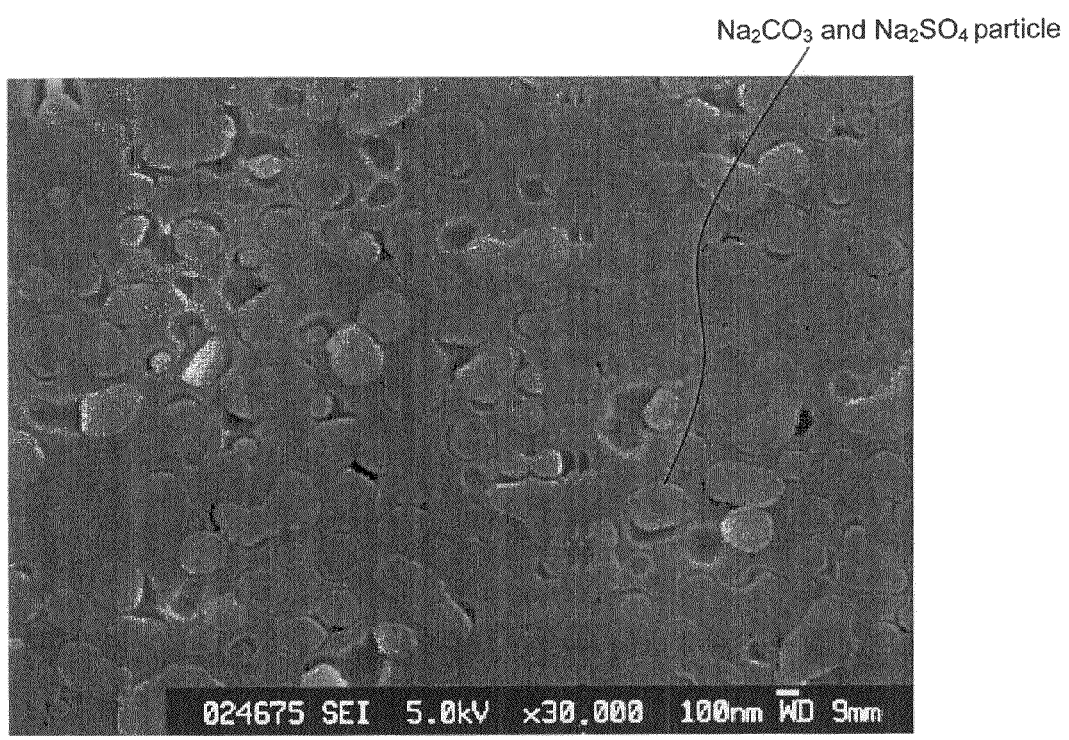
FIG. 13 is an SEM image of the surface-treated glass of Example 1 before water washing.

FIG. 13 is an SEM photograph showing the surface state of the surface-treated glass of Example 1 after exposure to water vapor but before water washing. As seen in FIG. 13, a lot of concave portions are provided in the glass surface before water washing and attached substances are filled in each concave portion. The attached substances were analyzed and found to be $Na_2CO_3$ and $Na_2SO_4$. It is considered that NaOH absorbs a carbon dioxide gas in air and undergoes a chemical change to produce $Na_2CO_3$.

As apparent from the results in FIG. 13, it is considered that when a glass is heated and then contacted with an atmosphere containing a high concentration of water, a state of a lot of OH groups being introduced into the glass surface is created and an alkali metal in the surface components of glass reacts with water to cause uniform nucleation of a product such as NaOH and $NaSO_4$ on the order of nanometers and allow for corrosion of the glass surface by this product, which results in formation of concave portions.

While the invention has been described in detail and with reference to specific embodiments thereof, it will be apparent to one skilled in the art that various changes and modifications can be made therein without departing from the spirit and scope thereof.

This application is based on Japanese Patent Application (Patent Application No. 2006-327317) filed on Dec. 4, 2006, the contents of which are incorporated herein by way of reference.

INDUSTRIAL APPLICABILITY

The surface-treated glass of the present invention can be utilized, for example, as an optical element such as antireflection plate, a water-repellent glass used as automotive glass, a hydrophilic glass, or a substrate for magnetic disks.

The invention claimed is:

1. A process for producing a surface-treated glass, which comprises exposing a glass heated in the range from strain point (° C.) to strain point +250 (° C.) to an atmosphere containing water in a concentration of 0.01 to 20 g/L and $SO_2$ or $NO_2$ in a concentration not more than 100 ppm which is sufficient to accelerate formation of a plurality of concave portions in the glass surface;
wherein the glass contains an alkali component in the range of 1 to 30 mass % in terms of an oxide and has a plate shape, and the exposure time for exposing the glass to the atmosphere is 1 minute to no more than 30 minutes.

2. The process for producing a surface-treated glass according to claim 1, wherein $SO_2$ is contained in the atmosphere.

3. The process for producing a surface-treated glass according to claim 1, wherein the exposure time for exposing the glass to the atmosphere is 3 to 30 minutes.

4. The process for producing a surface-treated glass according to claim 1, wherein exposing the glass to the atmosphere is performed in a slow cooling step after a forming step on a glass plate production line.

5. The process for producing a surface-treated glass according to claim 1, wherein the glass has a temperature in the range from 510° C. to 760° C.

6. The process for producing a surface-treated glass according to claim 1, wherein the glass has a temperature in the range from 550° C. to 700° C.

7. The process for producing a surface-treated glass according to claim 1, wherein a plane of the glass surface, excluding a region in which the concave portions are formed, is a flat plane, and the concave portions have an average open pore diameter of 10 nm to less than 1 μm in a cross-sectional view thereof.

8. The process for producing a surface-treated glass according to claim 7, wherein an area ratio of an open pore area of the concave portions to the unit area of the glass surface is from 5 to 80%, and an average pitch between respective concave portions is 1 μm or less in a cross-sectional view of the plurality of the concave portions.

9. The process for producing a surface-treated glass according to claim 8, wherein the surface-treated glass having a plate shape transmits at least 99% of light in the visible light range in comparison to untreated glass having a plate shape.

10. The process for producing a surface-treated glass according to claim 1, wherein the surface-treated glass having a plate shape transmits at least 99% of light in the visible light range in comparison to untreated glass having a plate shape.

11. A process for producing a surface-treated glass, which comprises exposing a glass heated in the range from strain point (° C.) to strain point +250 (° C.) to an atmosphere containing water in a concentration of 0.01 to 20 g/L to form a plurality of concave portions in the glass surface;
wherein the glass contains an alkali component in the range of 1 to 30 mass % in terms of an oxide and has a plate shape,
the atmosphere containing water further contains $SO_2$ or $NO_2$ in a concentration sufficient to accelerate reaction of forming a product which contributes to the production of the plurality of concave portions in the glass surface by an alkali metal in the glass together with water, and
the exposure time for exposing the glass to the atmosphere is 1 minute to no more than 30 minutes.

12. The process for producing a surface-treated glass according to claim 11, wherein the atmosphere contains $SO_2$ in a concentration of 0.1 to 100 ppm.

13. The process for producing a surface-treated glass according to claim 11, wherein the surface-treated glass having a plate shape transmits at least 99% of light in the visible light range in comparison to untreated glass having a plate shape.

* * * * *